US011559932B2

(12) United States Patent
Schad et al.

(10) Patent No.: US 11,559,932 B2
(45) Date of Patent: Jan. 24, 2023

(54) INJECTION MOLDING MACHINE WITH PART-HANDLING APPARATUS

(71) Applicant: Niigon Machines Ltd., Vaughan (CA)

(72) Inventors: Robert D. Schad, Toronto (CA); Luke Osmokrovic, Toronto (CA); Carsten Link, Burlington (CA)

(73) Assignee: NIIGON MACHINES LTD., Vaughan (CA)

( * ) Notice: Subject to any disclaimer, the term of this patent is extended or adjusted under 35 U.S.C. 154(b) by 948 days.

(21) Appl. No.: 16/212,782

(22) Filed: Dec. 7, 2018

(65) Prior Publication Data
US 2019/0105823 A1    Apr. 11, 2019

Related U.S. Application Data

(63) Continuation of application No. PCT/CA2017/050694, filed on Jun. 7, 2017.
(Continued)

(51) Int. Cl.
*B29C 45/42*    (2006.01)
*B25J 9/02*    (2006.01)
(Continued)

(52) U.S. Cl.
CPC ............. *B29C 45/42* (2013.01); *B25J 9/0087* (2013.01); *B25J 9/0093* (2013.01); *B25J 9/02* (2013.01);
(Continued)

(58) Field of Classification Search
CPC .... B29C 2045/4266; B29C 2045/4291; B29C 2045/4283; B29C 2045/4241;
(Continued)

(56) References Cited

U.S. PATENT DOCUMENTS 6,648,626 B1 * 11/2003 Eltvedt ............... B29C 45/1769
425/436 RM
8,025,828 B2    9/2011 Armbruster
(Continued)

FOREIGN PATENT DOCUMENTS

CA    2607310 A1    4/2009
CN    103025503 A    4/2013
(Continued)

OTHER PUBLICATIONS

International Search Report and Written Opinion of corresponding International Application No. PCT/CA2017/050694 dated Aug. 23, 2017.

*Primary Examiner* — Armand Melendez
(74) *Attorney, Agent, or Firm* — Bereskin & Parr/S.E.N.C.R.L., s.r.l.

(57) ABSTRACT

An injection molding machine includes a machine base; a stationary platen fixed to the base for holding a stationary mold section; a moving platen slidably supported by the base for holding a moving mold section; a rotary apparatus slidably supported by the base axially intermediate the stationary and moving platens for supporting a plurality of center mold sections and moving the center mold sections among axial positions directed toward the stationary and moving mold sections and lateral positions directed toward the operator and non-operator side of the machine; and a part-handling apparatus mounted to the stationary platen. The part-handling apparatus includes an end-of-arm tooling disposed laterally outboard of the rotary apparatus. The end-of-arm tooling is movable laterally between an engaged position for interacting with molded articles in one of the center mold sections in the lateral positions, and a disengaged position spaced laterally outwardly from the engaged position.

18 Claims, 5 Drawing Sheets

Related U.S. Application Data

(60) Provisional application No. 62/346,816, filed on Jun. 7, 2016.

(51) Int. Cl.
  *B29C 45/16* (2006.01)
  *B25J 9/00* (2006.01)
  *B29C 45/04* (2006.01)

(52) U.S. Cl.
  CPC ...... *B29C 45/0441* (2013.01); *B29C 45/1628* (2013.01)

(58) Field of Classification Search
  CPC .. B29C 2945/76317; B29C 2945/7632; B29C 2945/76799; B29C 2945/76795; B25J 9/0093
  See application file for complete search history.

(56) References Cited

U.S. PATENT DOCUMENTS

| | | | |
|---|---|---|---|
| 8,414,813 B2 | 4/2013 | Jung et al. | |
| 8,672,668 B2 | 3/2014 | Armbruster | |
| 2005/0276877 A1 | 12/2005 | Nihei et al. | |
| 2006/0082010 A1 | 4/2006 | Saggese et al. | |
| 2006/0244178 A1 | 11/2006 | Armbruster | |
| 2012/0086141 A1* | 4/2012 | Jung | B29C 45/1615 425/588 |
| 2012/0088000 A1 | 4/2012 | Armbruster | |
| 2013/0101695 A1 | 4/2013 | Schad et al. | |
| 2013/0302457 A1 | 11/2013 | Zahoransky | |
| 2013/0319815 A1* | 12/2013 | Kennedy | B65G 11/00 193/32 |
| 2015/0042014 A1* | 2/2015 | Duffey | B29C 45/0084 264/328.16 |
| 2017/0165888 A1* | 6/2017 | Watanabe | B25J 9/16 |

FOREIGN PATENT DOCUMENTS

| | | |
|---|---|---|
| DE | 102009023719 A1 | 12/2010 |
| EP | 1628819 B1 | 9/2010 |
| EP | 2735421 A2 | 5/2014 |
| JP | 2007007989 A | 1/2007 |
| JP | 4159023 B2 | 10/2008 |
| WO | 2005077637 A1 | 8/2005 |

* cited by examiner

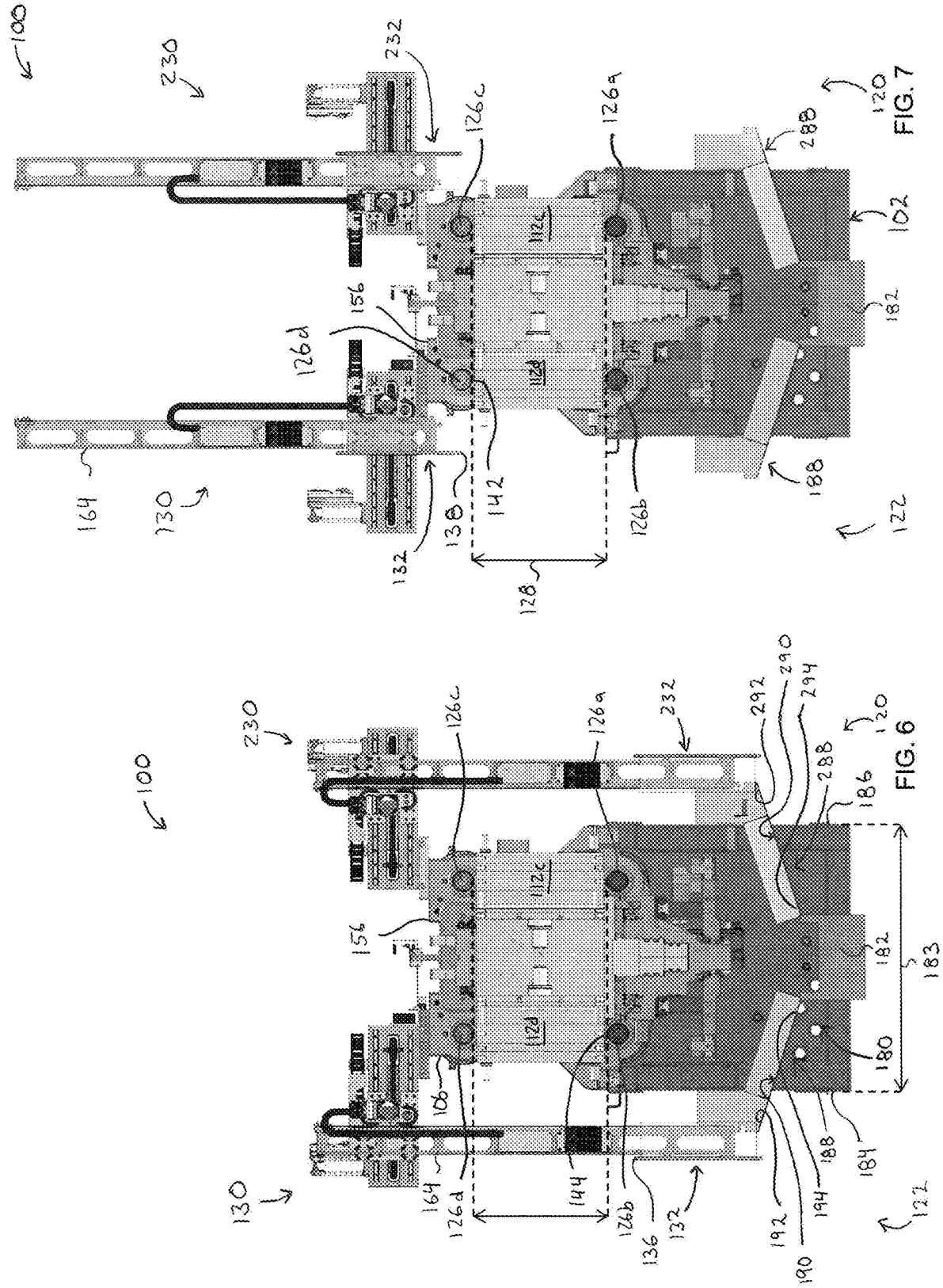

INJECTION MOLDING MACHINE WITH PART-HANDLING APPARATUS

This application is a continuation of PCT Application Serial No. PCT/CA2017/050694, filed Jun. 7, 2017, which claims the benefit of Provisional Application Ser. No. 62/346,816, filed Jun. 7, 2016, each of which is hereby incorporated herein by reference.

FIELD

The specification relates to injection molding machines, elements thereof, and methods and apparatuses for handling injection molded parts.

BACKGROUND

U.S. Pat. No. 8,025,828 (Armbruster) discloses an injection molding device with a first mold half and a second mold half, arranged movably with respect to said first half, and a central mold half arranged between said first and second halves and rotatable about an axis of rotation. Arranged to the side of the central mold half is a further processing device.

U.S. Pat. No. 8,672,668 (Armbruster) discloses a device for producing hinged closures out of plastic. The device has a prismatic central block which can be rotated about a rotational axis, said block being arranged between a first and a second molding plate. The first and the second molding plates are movable in relation to the central block in a first direction, and in a closed position, form a plurality of cavities in the area of a first and a second parting plane. The device has a handling system used to remove and transport the hinged closures onto a capping device in accordance with their layout.

U.S. Pat. App. Pub. No. 2013/0302457 (Zahoransky) discloses an injection-molding machine having a stack mold for producing injection-molded parts, first and second external mold parts and a rotatably mounted central block, the external mold parts each having a distribution plate having a hot runner for the injection material, and mold cavities being formed between molding regions on inner sides of the mold plates of the external mold parts and molding regions being formed on mold plates on opposite outer sides of the central block. At least one gripper is provided. The mold plates of the external mold parts and the central block are held detachably in place. The mold plates of the external mold parts are positionable on the distribution plates to correspond to respective feed channels, and the mold plates of the central block are positionable on the central block to correspond to respective positions of the mold plates of the external mold parts.

SUMMARY

The following summary is intended to introduce the reader to various aspects of the applicant's teaching, but not to define any invention. In general, disclosed herein are one or more methods or apparatuses related to injection molding, and to handling parts associated with injection molding.

According to some aspects, an injection molding machine includes a) a machine base extending lengthwise along a generally horizontal machine axis; b) a stationary platen fixed to the base for holding a stationary mold section; and c) a moving platen slidably supported by the base for holding a moving mold section. The moving platen is translatable towards and away from the stationary platen along the machine axis. The machine further includes d) a rotary apparatus slidably supported by the base axially intermediate the stationary and moving platens. The rotary apparatus includes a mold carriage translatable along the machine axis towards and away from the stationary platen, and a table rotatably mounted to the mold carriage for supporting horizontally opposed first and second center mold sections and horizontally opposed third and fourth center mold sections perpendicular to the first and second center mold sections. The table is rotatable relative to the mold carriage about a vertical axis for moving the center mold sections among axial positions directed toward the stationary and moving mold sections and lateral positions directed toward an operator side and a non-operator side of the machine. The machine further includes (e) a part-handling apparatus mounted to the stationary platen. The part-handling apparatus includes an end-of-arm tooling disposed laterally outboard of the rotary apparatus. The end-of-arm tooling is movable laterally between an engaged position for interacting with molded articles in one of the center mold sections in the lateral positions, and a disengaged position spaced laterally outwardly from the engaged position.

In some examples, the end-of-arm tooling is movable vertically among an aligned position, in which the end-of-arm tooling is movable laterally to the engaged position, and at least one of a raised position above the aligned position for providing access to the one of the center mold sections, and a lowered position below the aligned position for transferring molded articles unloaded from the one of the center mold sections.

In some examples, the machine includes an upper tie bar and a lower tie bar each extending generally parallel to the machine axis between the stationary and moving platens for exerting a clamping load across the platens. In some examples, the end-of-arm tooling has an upper end, a lower end, and a part-handling face between the upper and lower ends for interacting with molded articles. The part-handling face may be generally vertically intermediate the upper and lower tie bars when the end-of-arm tooling is in the aligned position.

In some examples, the end-of-arm tooling is movable vertically to the raised position. In some examples, a lower end of the end-of-arm tooling is at least as high as an underside surface of the upper tie bar when the end-of-arm tooling is in the raised position.

In some examples, the end-of-arm tooling is movable vertically to the lowered position. In some examples, the upper end of the end-of-arm tooling is at least as low as a topside surface of the lower tie bar when the end-of-arm tooling is in the lowered position.

In some examples, the part-handling face is directed laterally inwardly toward the base when the end-of-arm tooling is in and moves among respective positions.

In some examples, the end-of-arm tooling is axially locked relative to the stationary platen during normal machine operation.

In some examples, the part-handling apparatus has a weight, and substantially all of the weight is borne by the stationary platen.

In some examples, the part-handling apparatus includes a mount movably coupling the end-of-arm tooling to the stationary platen. The mount may include a static mount portion mounted to a top surface of the stationary platen and a dynamic mount portion movably coupled to the static mount portion and supporting the end-of-arm tooling. The dynamic mount portion may be movable relative to the static mount portion for moving the end-of-arm tooling among respective positions.

In some examples, the static mount portion includes a lateral slide, and the dynamic mount portion includes a mount carriage slidably coupled to the lateral slide and supporting the end-of-arm tooling. The mount carriage may be laterally slidable along the lateral slide for moving the end-of-arm tooling between the engaged and disengaged positions.

In some examples, the lateral slide extends laterally outboard of the stationary platen, and the mount carriage is slidable along the lateral slide laterally outboard of the stationary platen when moving the end-of-arm tooling to the disengaged position.

In some examples, the stationary platen includes a mounting face directed toward the moving platen for supporting the stationary mold section, and the lateral slide is spaced axially apart from the mounting face toward the moving platen.

In some examples, the lateral slide is axially fixed relative to the end-of-arm tooling and locked relative to the stationary platen at a lateral slide axial position during normal machine operation. The lateral slide axial position may be adjustable relative to the stationary platen for adjusting an end-of-arm tooling axial position of the end-of-arm tooling.

In some examples, the static mount portion includes an adjustment plate adjustably coupling the lateral slide to the stationary platen. The lateral slide axial position may be adjustable over an axial adjustment length of the adjustment plate. The axial adjustment length may be greater than an axial extent of the top surface of the stationary platen.

In some examples, the dynamic mount portion includes a vertical arm movably supported by the mount carriage. The end-of-arm tooling may be fixed to a lower end of the vertical arm. The vertical arm may be movable vertically relative to the mount carriage for vertically moving the end-of-arm tooling.

In some examples, the machine base has a width between laterally opposed and axially extending sides of the machine base. In some examples, the machine further includes a molded article conveyor for transporting molded articles in an axial direction. The molded article conveyor may extend parallel to the machine axis laterally intermediate the sides of the machine base and beneath at least one of the stationary and moving platens. In some examples, the machine includes a chute mounted to the base for guiding molded articles received from the end-of-arm tooling onto the conveyor.

In some examples, the chute has an inclined guide surface extending between an upper portion positioned laterally outboard of one of the sides of the machine base below the end-of-arm tooling for receiving molded articles from the end-of-arm tooling, and a lower portion positioned laterally intermediate the sides of the machine base adjacent the conveyor for directing received molded articles onto the conveyor.

According to some aspects, an injection molding machine includes a) a machine base extending lengthwise along a generally horizontal machine axis; b) a stationary platen fixed to the base for holding a stationary mold section; and c) a moving platen slidably supported by the base for holding a moving mold section. The moving platen is translatable towards and away from the stationary platen along the machine axis. The machine further includes d) a rotary apparatus slidably supported by the base axially intermediate the stationary and moving platens. The rotary apparatus includes a mold carriage translatable along the machine axis towards and away from the stationary platen, and a table rotatably mounted to the mold carriage for supporting horizontally opposed first and second center mold sections and horizontally opposed third and fourth center mold sections perpendicular to the first and second center mold sections. The table is rotatable relative to the mold carriage about a vertical axis for moving the center mold sections among axial positions directed toward the stationary and moving mold sections and lateral positions directed toward an operator side and a non-operator side of the machine. The machine further includes e) a part-handling apparatus having an end-of-arm tooling disposed laterally outboard of the rotary apparatus. The end-of-arm tooling is movable laterally between an engaged position for interacting with the molded articles in one of the center mold sections in the lateral positions and a disengaged position spaced laterally outwardly from the engaged position. The end-of-arm tooling is movable vertically among an aligned position in which the end-of-arm tooling is movable to the engaged position, and at least one of a raised position above the aligned position for providing access to the one of the center mold sections and a lowered position below the aligned position for transferring molded articles unloaded from the one of the center mold sections.

According to some aspects, an injection molding machine includes a) a machine base extending lengthwise along a generally horizontal machine axis; b) a stationary platen fixed to the base for holding a stationary mold section; and c) a moving platen slidably supported by the base for holding a moving mold section. The moving platen is translatable towards and away from the stationary platen along the machine axis. The machine further includes d) a rotary apparatus slidably supported by the base axially intermediate the stationary and moving platens. The rotary apparatus includes a mold carriage translatable along the machine axis towards and away from the stationary platen, and a table rotatably mounted to the mold carriage for supporting horizontally opposed first and second center mold sections and horizontally opposed third and fourth center mold sections perpendicular to the first and second center mold sections. The table is rotatable relative to the mold carriage about a vertical axis for moving the center mold sections among axial positions directed toward the stationary and moving mold sections and lateral positions directed toward an operator side and a non-operator side of the machine. The machine further includes e) a first part-handling apparatus mounted to the stationary platen. The first part-handling apparatus includes a first end-of-arm tooling disposed laterally outboard of the rotary apparatus on the non-operator side of the machine for interacting with molded articles in the center mold section directed toward the non-operator side of the machine. The machine further includes f) a second part-handling apparatus mounted to the stationary platen. The second part-handling apparatus includes a second end-of-arm tooling disposed laterally outboard of the rotary apparatus on the operator side of the machine for interacting with molded articles in the center mold section directed toward the operator side of the machine.

According to some aspects, an injection molding machine includes a machine base extending lengthwise along a generally horizontal machine axis and having a width between laterally opposed and axially extending sides of the machine base; b) a stationary platen fixed to the base for holding a stationary mold section; and c) a moving platen slidably supported by the base for holding a moving mold section. The moving platen is translatable towards and away from the stationary platen along the machine axis. The machine further includes d) a rotary apparatus slidably supported by the base axially intermediate the stationary and moving platens. The rotary apparatus includes a mold carriage translatable along the machine axis towards and away from the stationary platen, and a table rotatably mounted to the mold carriage for supporting horizontally opposed first and second center mold sections and horizontally opposed third and fourth center mold sections perpendicular to the first and second center mold sections. The table is rotatable relative to the mold carriage about a vertical axis for moving the center mold sections among axial positions directed toward the stationary and moving mold sections and lateral positions directed toward an operator side and a non-operator side of the machine. The machine further includes e) a molded article conveyor for transporting molded articles in an axial direction. The conveyor extends parallel to the machine axis laterally intermediate the sides of the machine base and beneath at least one of the moving and stationary platens. The machine further includes f) a first chute mounted to the base on the non-operator side of the machine for guiding molded articles unloaded from the center mold section directed toward the non-operator side of the machine onto the conveyor. In some examples, the machine further includes g) a second chute mounted to the base on the operator side of the machine for guiding molded articles unloaded from the center mold section directed toward the operator side of the machine onto the conveyor.

In some examples, each chute has an inclined guide surface extending between an upper portion positioned laterally outboard of a respective one of the sides of the machine base for receiving molded articles unloaded from a respective center mold section, and a lower portion positioned laterally intermediate the sides of the machine base adjacent the conveyor for directing received molded articles onto the conveyor.

According to some aspects, a method of operating an injection molding machine includes a) rotating a table about a vertical axis to move a center mold section from an axial position to a lateral position. The center mold section is directed toward one of a stationary mold section held by a stationary platen and a moving mold section held by a moving platen when in the axial position. The center mold section is directed toward one of an operator side and a non-operator side of the machine when in the lateral position. The method further includes b) when the center mold section is in the lateral position, moving an end-of-arm tooling laterally inwardly toward the center mold section into an engaged position for interacting with molded articles in the center mold section; c) moving the end-of-arm tooling from the engaged position to a disengaged position spaced laterally outwardly from the engaged position; and d) moving the end-of-arm tooling vertically from an aligned position, in which the end-of-arm tooling is movable to the engaged position, to one of a raised position above the aligned position for providing access to the center mold section and a lowered position below the aligned position for transferring molded articles unloaded from the center mold section.

In some examples, the end-of-arm tooling includes a part-handling face for interacting with molded articles. The part-handling face is directed laterally inwardly toward the base when the end-of-arm tooling is in and moves among respective positions.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 6 is the same view as FIG. 4, but showing the part-handling portions in a lowered condition; and FIG. 7 is the same view as FIG. 4, but showing the part-handling portions in a raised condition.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
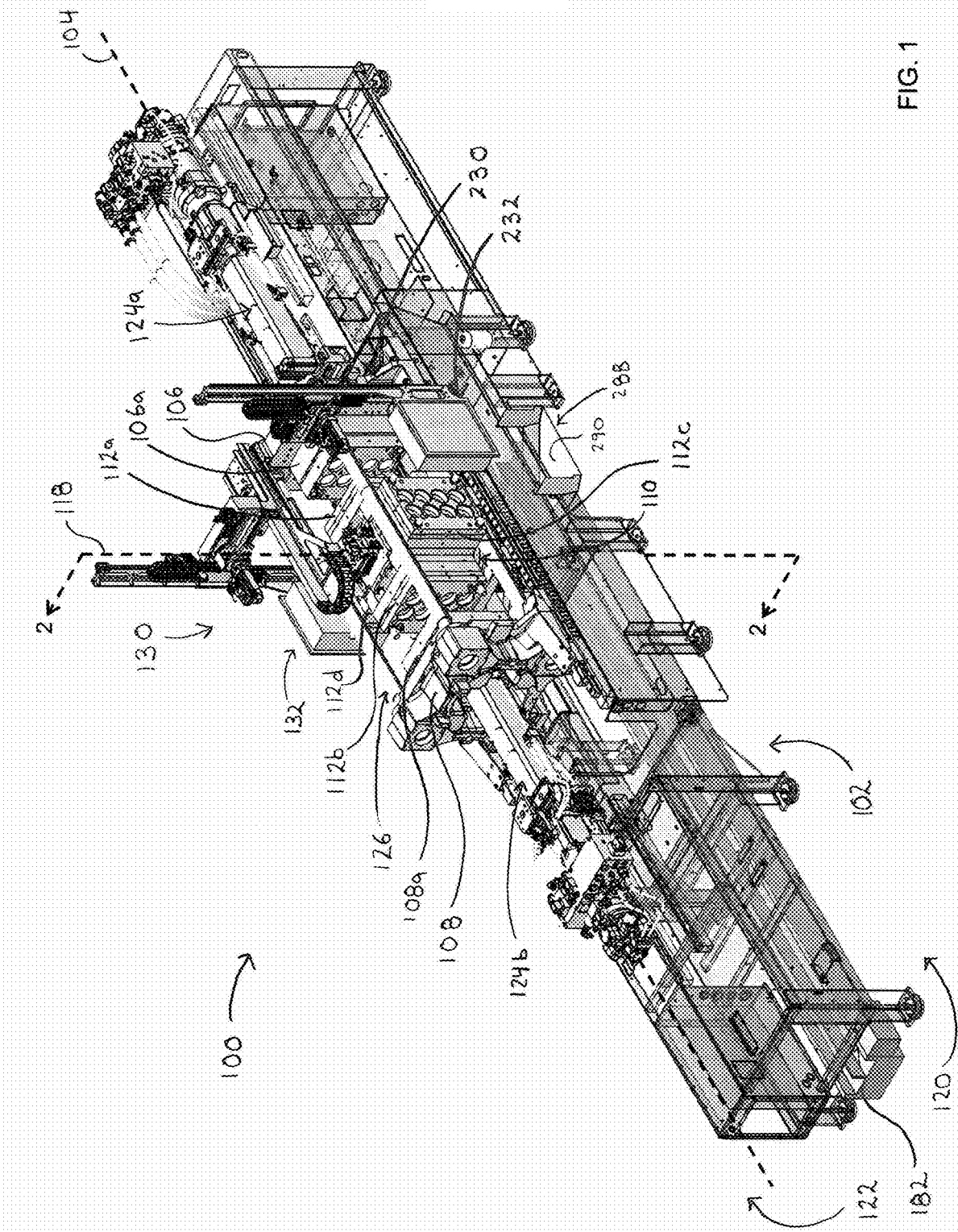
FIG. 1 is a perspective view, taken from the operator side, of an example injection molding machine shown in a mold-open condition.

Referring to FIG. 1, an example of an injection molding machine 100 includes a machine base 102 extending lengthwise along a generally horizontal machine axis 104. A stationary platen 106 is fixed to the base 102 for holding a stationary mold section 106a, and a moving platen 108 is slidably supported by the base 102 for holding a moving mold section 108a. The moving platen 108 is translatable towards and away from the stationary platen 106 along the machine axis 104.

Figure 2:
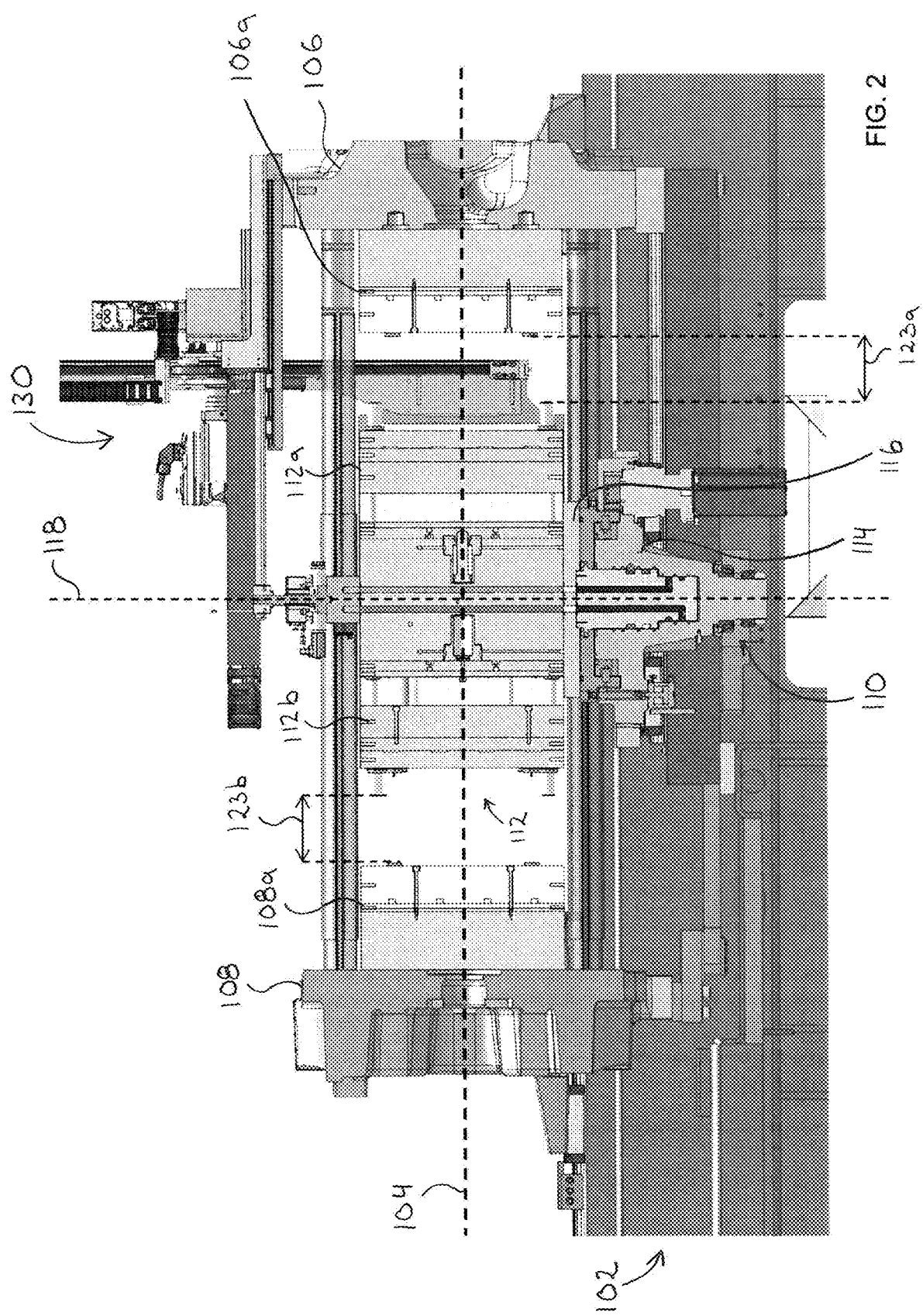
FIG. 2 is a cross-sectional view, taken along line 2 of FIG. 1, of portions of the machine of FIG. 1.

Referring to FIG. 2, in the example illustrated, the machine 100 further includes a rotary apparatus 110 for rotatably supporting a plurality of center mold sections 112. The rotary apparatus 110 is slidably supported by the machine base 102 axially intermediate the stationary and moving platens 106, 108, and is translatable relative to the base 102 along the machine axis 104.

In the example illustrated, the rotary apparatus 110 includes a mold carriage 114 translatable along the machine axis 104 towards and away from the stationary platen 106, and a table 116 rotatably mounted to the mold carriage 114 for supporting the center mold sections 112. Referring to FIG. 1, in the example illustrated, the table 116 supports horizontally opposed first and second center mold sections 112a, 112b and horizontally opposed third and fourth center mold sections 112c, 112d perpendicular to the first and second center mold sections 112a, 112b.

Referring to FIG. 1, in the example illustrated, when the machine 100 is in a mold-open condition, the table 116 is rotatable relative to the mold carriage 114 about a vertical axis 118 (see also FIGS. 2 and 4) for moving the center mold sections 112 among axial positions directed toward the stationary and moving mold sections 106a, 108a, and lateral positions directed toward an operator side 120 and a non-operator side 122 of the machine 100. In the example illustrated, the first and second center mold sections 112a, 112b are shown in the axial positions, with the first center mold section 112a directed toward the stationary mold section 106a and the second center mold section 112b directed toward the moving mold section 108a. The third and fourth center mold sections 112c, 112d are shown in the lateral positions, with the third center mold section 112c directed toward the operator side 120 of the machine 100 and the fourth center mold section 112d directed toward the non-operator side 122 of the machine 100.

When the machine 100 is in a mold-closed condition (FIG. 3), the moving platen 108 and the rotary apparatus 110 are in respective advanced (mold-closed) positions nearest the stationary platen 106, the center mold section 112 directed toward the stationary mold section 106a (shown as center mold section 112a in FIGS. 1-3) is in engagement with the stationary mold section 106a, and the center mold section 112 directed toward the moving mold section 108a (shown as center mold section 112b in FIGS. 1-3) is in engagement with the moving mold section 108a. When the machine 100 is in the mold-open condition (FIGS. 1 and 2), the moving platen 108 and the rotary apparatus 110 are in respective retracted (mold-open) positions spaced axially apart from the respective advanced positions, the center mold section 112 directed toward the stationary mold section 106a is spaced axially apart from the stationary mold section 106a by a first axial spacing 123a, and the center mold section 112 directed toward the moving mold section 108a is spaced axially apart from the moving mold section 108a by a second axial spacing 123b. The first axial spacing 123a and the second axial spacing 123b are sized for facilitating interference free movement of the center mold sections 112 relative to the stationary and moving mold sections 106a, 108a during rotation of the table 116 about the vertical axis 118.

Referring to FIG. 1, the machine 100 includes at least one injection unit for injecting resin into mold cavities of the mold sections. In the example illustrated, the machine 100 includes a first injection unit 124a aligned parallel to the machine axis 104 and disposed axially outboard of the stationary platen 106, and a second injection unit 124b aligned parallel to the machine axis 104 and disposed axially outboard of the moving platen 108. The second injection unit 124b is, in the example illustrated, coupled to and translatable with the moving platen 108. During an injection cycle, the first injection unit 124a injects resin into mold cavities formed by the stationary mold section 106a and the center mold section 112 in engagement with the stationary mold section 106a, and the second injection unit 124b injects resin into mold cavities formed by the moving mold section 108a and the center mold section 112 in engagement with the moving mold section 108a.

Referring to FIG. 1, the machine 100 includes a plurality of tie bars 126 extending parallel to the machine axis 104 between the stationary and moving platens 106, 108. The moving platen 108 can be releasably locked to the tie bars 126 for exerting a clamp load across the stationary mold section 106a, the moving mold section 108a, and the center mold sections 112 in the axial positions when the machine 100 is in the mold-closed condition.

Figure 4:
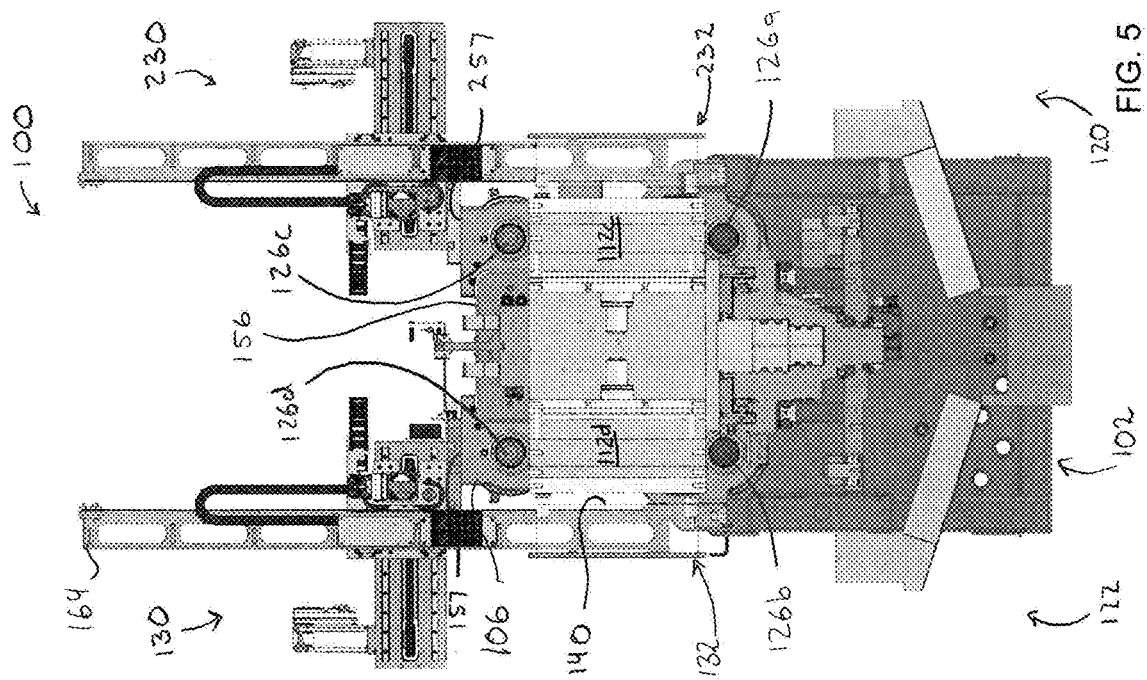
FIG. 4 is a cross-sectional view, taken along line 4 of FIG. 3, of the machine of FIG. 1 with part-handling portions of the machine shown in a disengaged condition.

Referring to FIG. 4, in the example illustrated, the machine 100 includes a front lower tie bar 126a and a transversely spaced apart rear lower tie bar 126b. The front lower tie bar 126a is disposed toward the operator side 120 of the machine 100, and the rear lower tie bar 126b is disposed toward the non-operator side 124 of the machine 100. The machine axis 104 is positioned laterally intermediate the front and rear lower ties bars 126a, 126b. The machine 100 further includes a front upper tie bar 126c spaced vertically above the front lower tie bar 126a, and a transversely spaced apart rear upper tie bar 126d spaced vertically above the rear lower tie bar 126b. The upper tie bars 126c, 126d are spaced vertically above the lower tie bars 126a, 126b by a vertical tie bar spacing 128. In the example illustrated, the center mold sections 112 are supported vertically intermediate the upper and lower tie bars 126a-d, and have a vertical extent 113 that is less than the vertical tie bar spacing 128.

The machine 100 can include at least one part-handling apparatus for interacting with molded articles in one or more mold sections. The part-handling apparatus can be disposed on one of the operator side 120 and the non-operator side 122 of the machine 100. The part-handling apparatus may be used to, for example, unload molded articles from a center mold section 112. Additionally or alternatively, the part-handling apparatus may facilitate performing post-mold operations such as, for example, post-mold cooling, movement of articles from a first set of mold cavities of a center mold section 112 to a second set of mold cavities of the same or a different center mold section 112, and/or assembly of first articles from a center mold section 112 with other articles, which may include second articles from the same or a different center mold section 112.

The part-handling apparatus can be configured as a linear (cartesian) axis robot for moving an end-effector (also referred to as an "end-of-arm tooling" or "EOAT") of the part-handling apparatus in one or more linear directions. The end-of-arm tooling can be disposed laterally outboard of the rotary apparatus 110 toward one of the operator side 120 and the non-operator side 122 of the machine 100. The end-of-arm tooling can be movable laterally between an engaged position for interacting with molded articles in, for example, a respective center mold section 112 in the lateral position, and a disengaged position spaced laterally apart from the engaged position. Interaction of the end-of-arm tooling with the molded articles may include, for example, approaching the articles, at least partially surrounding the articles, inserting into the articles, and/or contacting the articles. The end-of-arm tooling may include air jets or suction members to direct air towards or from surfaces of the articles to facilitate, for example, cooling and/or to apply a force to the articles for gripping or ejecting the articles.

Referring to FIG. 1, in the example illustrated, the machine 100 includes a first part-handling apparatus 130 on the non-operator side 122 of the machine 100. In the example illustrated, the first part-handling apparatus 130 includes a first end-of-arm tooling 132 disposed laterally outboard of the rotary apparatus 110 (and the center mold sections 112) on the non-operator side 122 of the machine 100. The first end-of-arm tooling 132 is movable laterally between an engaged position (FIG. 5) and a disengaged position (FIG. 4) spaced laterally outwardly from the engaged position. When in the engaged position, the first end-of-arm tooling 132 can interact with molded articles in the center mold section 112 directed toward the non-operator side 122 of the machine 100 (also referred to as a "non-operator-side center mold section", and shown as center mold section 112d in FIGS. 1 and 3-7).

Figure 5:
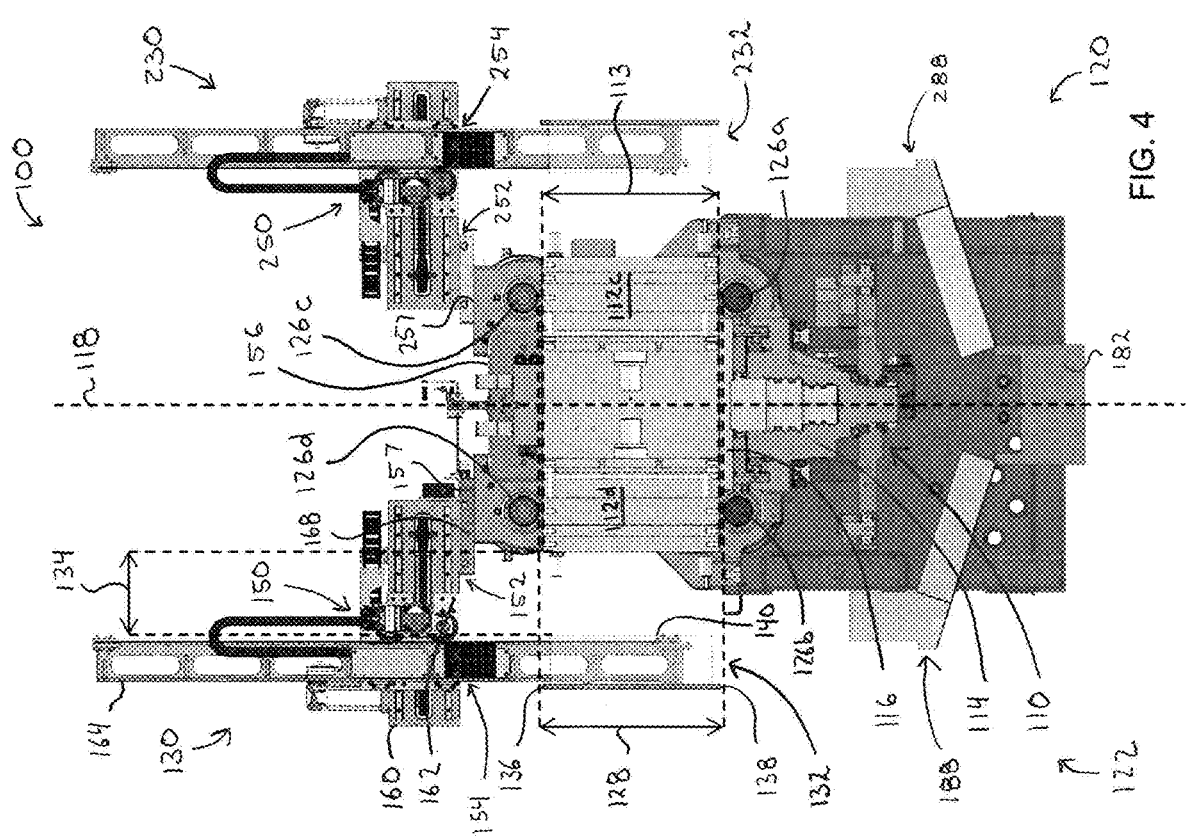
FIG. 5 is the same view as FIG. 4, but showing the part-handling portions in an engaged condition.

Referring to FIG. 5, in the example illustrated, when in the engaged position, the end-of-arm tooling 132 is adjacent the non-operator-side center mold section 112 for interacting with molded articles. Referring to FIG. 4, when in the disengaged position, the end-of-arm tooling 132 is spaced laterally outwardly apart from the non-operator-side center mold section 112 by a lateral spacing 134. The lateral spacing 134 is sized to provide lateral clearance for interference-free movement of the center mold sections 112 between the axial and lateral positions, and in the example illustrated, to facilitate transfer (e.g., dropping) of molded articles held by the end-of-arm tooling 132. In the example illustrated, the end-of-arm tooling 132 is disposed laterally outboard of the tie bars 126 (on the non-operator side 122 of the machine 100) when in and moving among respective positions.

The first part-handling apparatus 130 can optionally be configured for moving the end-of-arm tooling 132 vertically. In the example illustrated, the first end-of-arm tooling 132 is movable vertically among an aligned position (FIGS. 4 and 5) in which the first end-of-arm tooling 132 is movable laterally to the engaged position, and at least one of a raised position (FIG. 7) above the aligned position and a lowered position (FIG. 6) below the aligned position. In the example illustrated, the end-of-arm tooling 132 is movable vertically among the aligned position, the raised position, and the lowered position.

Figure 3:
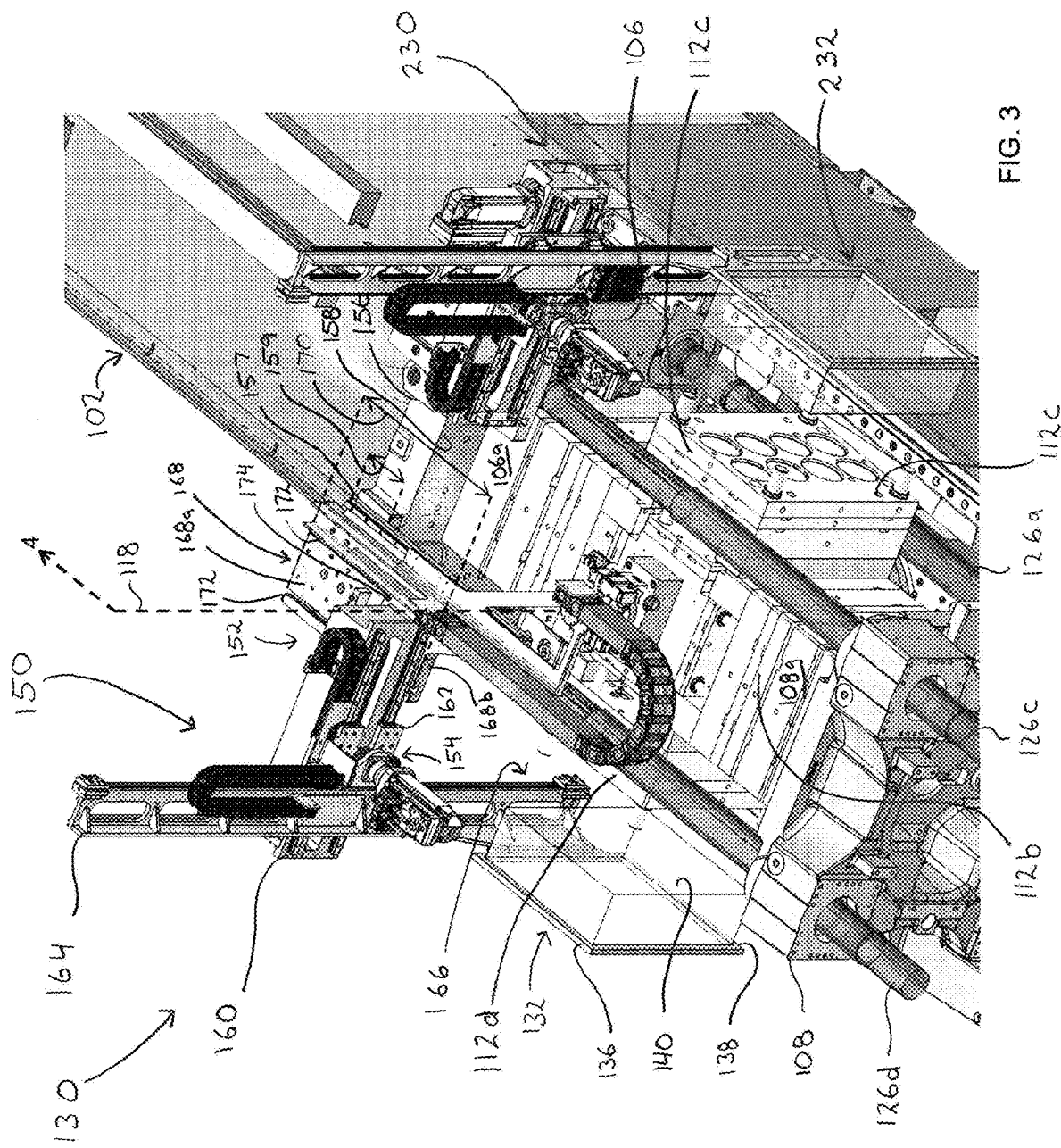
FIG. 3 is an enlarged perspective view of portions of the machine of FIG. 1 shown in a mold-closed condition.

Referring to FIG. 3, in the example illustrated, the end-of-arm tooling 132 has an upper end 136, a lower end 138, and a part-handling face 140 between the upper and lower ends 136, 138 for interacting with molded articles. In the example illustrated, the part-handling face 140 is directed laterally inwardly toward the base 102 when the end-of-arm tooling 132 is in and moves among respective positions.

Referring to FIGS. 4 and 5, in the example illustrated, when the end-of-arm tooling is in the aligned position, the part-handling face 140 is generally vertically intermediate the rear upper and lower tie bars 126b, 126d, and is in vertical alignment with the non-operator-side center mold section 112.

Referring to FIG. 7, in the example illustrated, the end-of-arm tooling 132 is movable to the raised position for providing access to the non-operator-side center mold section 112. In the example illustrated, when the end-of-arm tooling 132 is in the raised position, the lower end 138 of the end-of-arm tooling 132 is at least as high as an underside surface 142 of the rear upper tie bar 126d. In the raised position, the end-of-arm tooling 132 is clear of the vertical tie bar spacing 128 between the rear upper and lower tie bars 126b, 126d. This may facilitate inspection, maintenance, and/or replacement of one or more of the center mold sections 112, and/or other portions of the machine 100. In the example illustrated, when the end-of-arm tooling 132 is in the raised position, an entirety of the first part-handling apparatus 130 is clear of the vertical tie bar spacing 128.

Referring to FIG. 6, in the example illustrated, the end-of-arm tooling 132 is movable to the lowered position for transferring molded articles unloaded from the non-operator-side center mold section 112. Lowering the end-of-arm tooling 132 may facilitate transfer of molded articles from the end-of-arm tooling to, for example, a chute (such as chute 188), conveyor, platform, or other surface positioned below the end-of-arm tooling. Lowering the end-of-arm tooling 132 prior to transferring the molded articles may reduce the height from which the molded articles are dropped, and may facilitate more accurate transfer of the molded articles and/or reduce the possibility of damage to a molded article when dropped. In the example illustrated, when the end-of-arm tooling 132 is in the lowered position, the upper end 136 of the end-of-arm tooling 132 is at least as low as a topside surface 144 of the rear lower tie bar 126b.

The first part-handling apparatus 130 can optionally be configured as a linear (cartesian) two-axis robot for moving the end-of-arm tooling 132 in lateral and vertical directions only. In the example illustrated, the end-of-arm tooling 132 is axially locked relative to the stationary platen 106 during normal machine operation. The rotary apparatus 110 translates along the machine axis 112 relative to the part-handling apparatus 130 when moving between respective advanced (mold-closed) and retracted (mold-open) positions. Referring to FIG. 3, in the example illustrated, the end-of-arm tooling 132 is axially locked relative to the stationary platen 106 in an end-of-arm tooling axial position, in which the part-handling face 140 of the end-of-arm tooling 132 is in axial alignment with the non-operator-side center mold section 112 when the machine 100 is in the mold-closed condition. In the example illustrated, the location of the end-of-arm tooling axial position is adjustable for accommodating changes in mold height.

In the example illustrated, the part-handling apparatus 130 is mounted to the stationary platen 106. The part-handling apparatus 130 has a weight, and substantially all of the weight is borne by the stationary platen 106. The part-handling apparatus 130 may be generally free of any independent support structure extending between the part-handling apparatus 130 and portions of the machine 100 other than the stationary platen 106. The part-handling apparatus 130 may be generally free of any independent support structure extending between the part-handling apparatus 130 and a ground surface above which portions of the part-handling apparatus 130 may be positioned.

Referring to FIG. 3, in the example illustrated, the part-handling apparatus 130 includes a first mount 150 movably coupling the end-of-arm tooling 132 to the stationary platen 106. In the example illustrated, the mount 150 includes a first static mount portion 152 mounted to the stationary platen 106, and a first dynamic mount portion 154 movably coupled to the static mount portion 152 and supporting the end-of-arm tooling 132. The dynamic mount portion 154 is movable relative to the static mount portion 152 for moving the end-of-arm tooling 132 among respective positions.

Referring to FIG. 7, the static mount portion 152 may be disposed at an elevation generally above the upper tie bars 126c, 126d. In the example illustrated, the static mount portion 152 is mounted to a top surface 156 of the stationary platen 106. In the example illustrated, the top surface 156 of the stationary platen 106 has a first mounting interface 157 offset laterally relative to the machine axis 104 toward the non-operator side 122 of the machine 100. The first mounting interface 157 is generally laterally aligned with the rear tie bars 126b, 126d in the example illustrated. The static mount portion 152 is mounted to the first mounting interface 157.

Referring to FIG. 3, in the example illustrated, the static mount portion 152 includes a lateral slide 160, and the dynamic mount portion 154 includes a mount carriage 162 slidably coupled to the lateral slide 160 and supporting the end-of-arm tooling 132. The mount carriage 162 is laterally slidable along the lateral slide 160 for moving the end-of-arm tooling 132 between the engaged and disengaged positions. In the example illustrated, the lateral slide 160 extends laterally outboard of the stationary platen 106 (toward the non-operator side 122 of the machine 100), and the mount carriage 162 is slidable along the lateral slide 160 laterally outboard of the stationary platen 106 for moving the end-of-arm tooling 132 to the disengaged position. The mount carriage 162 is axially and vertically fixed relative to the lateral slide 160 in the example illustrated.

In the example illustrated, the dynamic mount portion 154 includes a vertical arm 164 supported by the mount carriage 162. In the example illustrated, the end-of-arm tooling 132 is fixed to a lower end 166 of the vertical arm 164. In the example illustrated, the vertical arm 164 is movably supported by the mount carriage 162, and is vertically translatable relative to the mount carriage 162 for moving the end-of-arm tooling 132 vertically among the aligned, raised, and lowered positions. In the example illustrated, the vertical arm 164 is axially and laterally fixed relative to the mount carriage 162. In the example illustrated, the vertical arm 164 is fixed in a generally vertical orientation during normal machine operation. In the example illustrated, the vertical arm 164 is disposed laterally outboard of the tie bars 126 (on the non-operator side 122 of the machine 100) when the end-of-arm tooling 132 is in and moves among respective positions.

In the example illustrated, the stationary platen 106 includes a mounting face 158 directed toward the moving platen 108 for supporting the stationary mold section 106a. The lateral slide 160 is spaced axially apart from the mounting face 158 toward the moving platen 108. This can provide for a reduced axial distance between the lateral slide 160 and the end-of-arm tooling axial position, and may help reduce moment loads exerted on the lateral slide 160.

In the example illustrated, the lateral slide 160 is axially locked relative to the stationary platen 106 at a lateral slide axial position during normal machine operation. In the example illustrated, the lateral slide 160 is axially fixed relative to the end-of-arm tooling 132, and the lateral slide axial position is adjustable relative to the stationary platen 106 for adjusting the end-of-arm tooling axial position.

In the example illustrated, the static mount portion 152 includes an adjustment plate 168 adjustably coupling the lateral slide 160 to the stationary platen 106. The adjustment plate 168 is fixed to the top surface 156 of the stationary platen 106 in the example illustrated. The lateral slide axial position is adjustable over an axial adjustment length 170 of the adjustment plate 168. The adjustment length 170 is greater than an axial extent 159 of the top surface of the stationary platen 106.

The adjustment plate 168 can include one or more axially extending t-slots for adjustably coupling the lateral slide 160 to the adjustment plate 160 and facilitating adjustment of the lateral slide axial position over the axial adjustment length 170. In the example illustrated, the adjustment plate 168 includes a pair of laterally spaced apart and axially extending t-slots 172, and the lateral slide 160 is adjustably coupled to the adjustment plate 168 via a plurality of t-slot fasteners 174.

In the example illustrated, the adjustment plate 168 has a first portion 168a mounted to the first mounting interface 157 of the top surface 156 of stationary platen 106, and a second portion 168b extending axially forward of the mounting face 158 of the stationary platen 106. The axial adjustment length 170 extends over the first and second portions 168a, 168b of the adjustment plate 168.

Referring to FIG. 6, in the example illustrated, the machine 100 includes a transport assembly 180 for transporting molded articles unloaded from one or more mold sections. In the example illustrated, the assembly 180 includes a molded article conveyor 182 extending parallel to the machine axis 104 for transporting unloaded molded articles in the axial direction. The machine base 102 has a width 183 between laterally opposed and axially extending first and second sides 184, 186 of the machine base 102. In the example illustrated, the first side 184 is on the non-operator side 122 of the machine 100, and the second side 186 is on the operator side 120 of the machine 100. The conveyor 182 is disposed laterally intermediate the sides 184, 186 of the base 102. Referring to FIG. 1, the conveyor 182 can extend beneath at least one of the stationary and moving platens 106, 108. In the example illustrated, the conveyor 182 extends beneath the moving platen 108 and the rotary apparatus 110.

Referring to FIG. 6, the assembly 180 can include at least one chute mounted to the base 102 on one of the operator side 120 and the non-operator side 122 of the machine 100 for guiding unloaded molded articles in the lateral direction onto the conveyor 182. In the example illustrated, the assembly 180 includes a first chute 188 mounted to the base 102 on the non-operator side 122 of the machine 100 for guiding molded articles unloaded from the non-operator-side center mold section 112 onto the conveyor 182.

In the example illustrated, the first chute 188 includes an inclined first chute guide surface 190 extending between a first chute upper portion 192 and a first chute lower portion 194. The first chute upper portion 192 is positioned below and aligned axially with the first end-of-arm tooling 132 for receiving molded articles from the first end-of-arm tooling 132. The first chute lower portion 194 is positioned adjacent the conveyor 182 for directing the received molded articles onto the conveyor 182. In the example illustrated, the first chute upper portion 192 is laterally outboard of the first side 184 of the base 102, and the first chute lower portion 194 is laterally intermediate the sides 184, 186 of the base 102.

Optionally, the machine 100 can include a second part-handling apparatus for interacting with molded articles in one or more mold sections. In the example illustrated, the machine 100 includes a second part-handling apparatus 230 on the operator side 120 of the machine 100. The second part-handling apparatus 230 has similarities to the first part-handling apparatus 130, and like features are identified by like reference characters, incremented by 100.

In the example illustrated, the second part-handling apparatus 230 includes a second end-of-arm tooling 232 disposed laterally outboard of the rotary apparatus 110 (and the center mold sections 112) on the operator side 120 of the machine 100. The second end-of-arm tooling 232 is movable laterally between an engaged position (FIG. 5) for interacting with molded articles in the center mold section 112 directed toward the operator side 120 of the machine 100 (also referred to as an "operator-side center mold section", and shown as center mold section 112c in FIGS. 1 and 3-7), and a disengaged position (FIG. 4) spaced laterally outwardly from the engaged position. In the example illustrated, the second end-of-arm tooling 232 is further movable vertically among an aligned position (FIGS. 4 and 5), and at least one of a raised position (FIG. 7) above the aligned position and a lowered position (FIG. 6) below the aligned position. In the example illustrated, the end-of-arm tooling 232 is movable vertically among the aligned position, the raised position, and the lowered position.

Referring to FIG. 3, in the example illustrated, the second part-handling apparatus 230 includes a second mount 250 movably coupling the second end-of-arm tooling 232 to the stationary platen 106. In the example illustrated, the second mount 250 includes a second static mount portion 252 mounted to the stationary platen 206, and a second dynamic mount portion 254 movably coupled to the static mount portion 252 and supporting the second end-of-arm tooling 232. Referring to FIG. 4, the static mount portion 252 is mounted to a top surface 256 of the stationary platen 106. In the example illustrated, the top surface 156 of the stationary platen 106 has a second mounting interface 257 offset laterally relative to the machine axis 104 toward the operator side 120 of the machine 100. The second mounting interface 257 is generally laterally aligned with the front tie bars 126a, 126c in the example illustrated. The static mount portion 252 is mounted to the second mounting interface 257.

Referring to FIG. 6, in the example illustrated, the transport assembly 180 optionally includes a second chute 288 mounted to the base 102 on the operator side 120 of the machine 100 for guiding molded articles unloaded from the operator-side center mold section 112 onto the conveyor 182. The second chute 288 has similarities to the first chute 188, and like features are indicated by like reference characters, incremented by 100.

In the example illustrated, the second chute 288 includes an inclined second chute guide surface 290 extending between a second chute upper portion 292 and a second chute lower portion 194. The second chute upper portion 292 is positioned below and aligned axially with the second end-of-arm tooling 232 for receiving molded articles from the second end-of-arm tooling 232. The second chute lower portion 294 is positioned adjacent the conveyor 182 for directing the received molded articles onto the conveyor 182. In the example illustrated, the second chute upper portion 292 is laterally outboard of the second side 186 of the base 102, and the second chute lower portion 294 is laterally intermediate the sides 184, 186 of the base 102.

The invention claimed is:

1. An injection molding machine comprising:
   a) a machine base extending lengthwise along a generally horizontal machine axis;
   b) a stationary platen fixed to the base for holding a stationary mold section;
   c) a moving platen slidably supported by the base for holding a moving mold section, the moving platen translatable towards and away from the stationary platen along the machine axis;
   d) a rotary apparatus slidably supported by the base axially intermediate the stationary and moving platens, the rotary apparatus including a mold carriage translatable along the machine axis towards and away from the stationary platen, and a table rotatably mounted to the mold carriage for supporting horizontally opposed first and second center mold sections and horizontally opposed third and fourth center mold sections perpendicular to the first and second center mold sections, the table rotatable relative to the mold carriage about a vertical axis for moving the center mold sections among axial positions directed toward the stationary and moving mold sections and lateral positions directed toward an operator side and a non-operator side of the machine;
   e) a part-handling apparatus mounted to the stationary platen, the part-handling apparatus including an end-of-arm tooling disposed laterally outboard of the rotary apparatus, the end-of-arm tooling movable laterally between an engaged position for interacting with molded articles in one of the center mold sections in the lateral positions, and a disengaged position spaced laterally outwardly from the engaged position, and the end-of-arm tooling movable vertically at least between an aligned position in which the end-of-arm tooling is movable laterally to the engaged position, and a raised position above the aligned position for providing access to the one of the center mold sections; and
   f) an upper tie bar and a lower tie bar each extending generally parallel to the machine axis between the stationary and moving platens for exerting a clamping load across the platens;
      wherein the end-of-arm tooling is further movable vertically to a lowered position below the aligned position for transferring molded articles unloaded from the one of the center mold sections; wherein the upper end of the end-of-arm tooling is at least as low as a topside surface of the lower tie bar when the end-of-arm tooling is in the lowered position.

2. The machine of claim 1, wherein the end-of-arm tooling has a part-handling face between the upper and lower ends for interacting with molded articles, the part-handling face generally vertically intermediate the upper and lower tie bars when the end-of-arm tooling is in the aligned position.

3. The machine of claim 2, wherein the lower end of the end-of-arm tooling is at least as high as an underside surface of the upper tie bar when the end-of-arm tooling is in the raised position.

4. The machine of claim 2, wherein the part-handling face is directed laterally inwardly toward the base when the end-of-arm tooling is in and moves among the aligned, raised, and lowered positions.

5. The machine of claim 1, wherein the end-of-arm tooling is axially locked relative to the stationary platen during normal machine operation.

6. The machine of claim 1, wherein the part-handling apparatus has a weight, and substantially all of the weight is borne by the stationary platen.

7. The machine of claim 1, wherein the part-handling apparatus includes a mount movably coupling the end-of-arm tooling to the stationary platen, the mount including a static mount portion mounted to a top surface of the stationary platen and a dynamic mount portion movably coupled to the static mount portion and supporting the end-of-arm tooling, the dynamic mount portion movable relative to the static mount portion for moving the end-of-arm tooling among respective positions.

8. The machine of claim 7, wherein the static mount portion includes a lateral slide, and the dynamic mount portion includes a mount carriage slidably coupled to the lateral slide and supporting the end-of-arm tooling, the mount carriage laterally slidable along the lateral slide for moving the end-of-arm tooling between the engaged and disengaged positions.

9. The machine of claim 8, wherein the lateral slide extends laterally outboard of the stationary platen, the mount carriage slidable along the lateral slide laterally outboard of the stationary platen when moving the end-of-arm tooling to the disengaged position.

10. The machine of claim 8, wherein the stationary platen includes a mounting face directed toward the moving platen for supporting the stationary mold section, and the lateral slide is spaced axially apart from the mounting face toward the moving platen.

11. The machine of claim 8, wherein the lateral slide is axially fixed relative to the end-of-arm tooling and locked relative to the stationary platen at a lateral slide axial position during normal machine operation, the lateral slide axial position adjustable relative to the stationary platen for adjusting an end-of-arm tooling axial position of the end-of-arm tooling.

12. The machine of claim 11, wherein the static mount portion includes an adjustment plate adjustably coupling the lateral slide to the stationary platen, the lateral slide axial position adjustable over an axial adjustment length of the adjustment plate, the axial adjustment length greater than an axial extent of the top surface of the stationary platen.

13. The machine of claim 8, wherein the dynamic mount portion includes a vertical arm movably supported by the mount carriage, the end-of-arm tooling fixed to a lower end of the vertical arm, the vertical arm movable vertically relative to the mount carriage for vertically moving the end-of-arm tooling.

14. The machine of claim 1, wherein the machine base has a width between laterally opposed and axially extending sides of the machine base, and wherein the machine further comprises a molded article conveyor for transporting molded articles in an axial direction, the molded article conveyor extending parallel to the machine axis laterally intermediate the sides of the machine base and beneath at least one of the stationary and moving platens, and wherein the machine further comprises a chute mounted to the base for guiding molded articles transferred from the end-of-arm tooling onto the conveyor.

15. The machine of claim 14, wherein the chute has an inclined guide surface extending between an upper portion positioned laterally outboard of one of the sides of the machine base beneath the end-of-arm tooling for receiving molded articles from the end-of-arm tooling, and a lower portion positioned laterally intermediate the sides of the machine base adjacent the conveyor for directing received molded articles onto the conveyor.

16. An injection molding machine comprising:
a) a machine base extending lengthwise along a generally horizontal machine axis;
b) a stationary platen fixed to the base for holding a stationary mold section;
c) a moving platen slidably supported by the base for holding a moving mold section, the moving platen translatable towards and away from the stationary platen along the machine axis;
d) a rotary apparatus slidably supported by the base axially intermediate the stationary and moving platens, the rotary apparatus including a mold carriage translatable along the machine axis towards and away from the stationary platen, and a table rotatably mounted to the mold carriage for supporting horizontally opposed first and second center mold sections and horizontally opposed third and fourth center mold sections perpendicular to the first and second center mold sections, the table rotatable relative to the mold carriage about a vertical axis for moving the center mold sections among axial positions directed toward the stationary and moving mold sections and lateral positions directed toward an operator side and a non-operator side of the machine;
e) a first part-handling apparatus mounted to the stationary platen, the first part-handling apparatus including a first end-of-arm tooling disposed laterally outboard of the rotary apparatus on the non-operator side of the machine, the first end-of-arm tooling movable vertically at least between a first aligned position in which the first end-of-arm tooling is movable toward the center mold section directed toward the non-operator side of the machine for interacting with molded articles therein, and a first raised position above the first aligned position for providing access to the center mold section directed toward the non-operator side of the machine;
f) a second part-handling apparatus mounted to the stationary platen, the second part-handling apparatus including a second end-of-arm tooling disposed laterally outboard of the rotary apparatus on the operator side of the machine, the second end-of-arm tooling movable vertically at least between a second aligned position in which the end-of-arm tooling is movable toward the center mold section directed toward the operator side of the machine for interacting with molded articles therein, and a second raised position above the second aligned position for providing access to the center mold section directed toward the operator side of the machine; and
g) an upper tie bar and a lower tie bar each extending generally parallel to the machine axis between the stationary and moving platens for exerting a clamping load across the platens;
wherein the first end-of-arm tooling is further movable vertically to a first lowered position below the first aligned position for transferring molded articles unloaded from the center mold section directed toward the non-operator side of the machine; wherein the upper end of the first end-of-arm tooling is at least as low as a topside surface of the lower tie bar when the first end-of-arm tooling is in the first lowered position, and wherein the second end-of-arm tooling is further movable vertically to a second lowered position below the second aligned position for transferring molded articles unloaded from the center mold section directed toward the operator side of the machine; wherein the upper end of the second end-of-arm tooling is at least as low as the topside surface of the lower tie bar when the second end-of-arm tooling is in the second lowered position.

17. The machine of claim 16, further comprising:
a) a molded article conveyor for transporting molded articles in an axial direction, the conveyor extending parallel to the machine axis laterally inboard of opposed operator and non-operator sides of the machine base and beneath at least one of the moving and stationary platens; and
b) a first chute mounted to the machine base at the non-operator side of the machine base for guiding molded articles unloaded by the first part-handling apparatus onto the conveyor; and
c) a second chute mounted to the machine base at the operator side of the machine base for guiding molded articles unloaded by the second part-handling apparatus onto the conveyor.

18. The machine of claim 17, where each chute has an inclined guide surface extending between an upper portion positioned laterally outboard of a respective one of the sides of the machine base for receiving molded articles unloaded from a respective center mold section, and a lower portion positioned laterally intermediate the sides of the machine base adjacent the conveyor for directing received molded articles onto the conveyor.

\* \* \* \* \*